(12) United States Patent
Kerr et al.

(10) Patent No.: US 12,470,927 B1
(45) Date of Patent: Nov. 11, 2025

(54) PROOF OF GEOFENCE

(71) Applicant: LOYALTY IOT, INC., Reno, NV (US)

(72) Inventors: Michael A. Kerr, Reno, NV (US); Jesus P. Espinoza, Las Vegas, NV (US)

(73) Assignee: LOYALTY IOT, INC., Reno, NV (US)

( * ) Notice: Subject to any disclaimer, the term of this patent is extended or adjusted under 35 U.S.C. 154(b) by 329 days.

(21) Appl. No.: 18/215,781

(22) Filed: Jun. 28, 2023

(51) Int. Cl.
| | |
|---|---|
| *H04W 12/069* | (2021.01) |
| *H04L 9/00* | (2022.01) |
| *H04L 9/32* | (2006.01) |
| *H04L 9/40* | (2022.01) |
| *H04W 12/64* | (2021.01) |

(52) U.S. Cl.
CPC ......... *H04W 12/069* (2021.01); *H04L 9/3297* (2013.01); *H04L 9/50* (2022.05); *H04L 63/0861* (2013.01); *H04W 12/64* (2021.01)

(58) Field of Classification Search
CPC .. H04W 12/069; H04W 12/64; H04L 9/3297; H04L 9/50; H04L 63/0861
USPC ...................................................... 455/456.3
See application file for complete search history.

(56) References Cited

U.S. PATENT DOCUMENTS

| | | | | |
|---|---|---|---|---|
| 10,943,471 | B1 * | 3/2021 | Giobbi | G07C 9/00182 |
| 11,297,056 | B1 * | 4/2022 | Lester | G06F 21/316 |
| 11,321,282 | B2 * | 5/2022 | Tran | H04B 7/0413 |
| 11,550,930 | B2 * | 1/2023 | Kerr | G01C 21/206 |
| 11,582,040 | B2 * | 2/2023 | Soundararajan | H04L 63/10 |
| 11,711,401 | B2 * | 7/2023 | Solari | H04W 12/06 |
| | | | | 726/3 |
| 11,734,902 | B2 * | 8/2023 | Malik | G06T 17/05 |
| | | | | 345/633 |
| 11,790,377 | B2 * | 10/2023 | Rahimizad | G06V 40/10 |
| | | | | 705/66 |
| 11,880,883 | B2 * | 1/2024 | Simpson | G06Q 50/01 |
| 12,041,041 | B2 * | 7/2024 | Colon | H04W 12/08 |

(Continued)

FOREIGN PATENT DOCUMENTS

WO    WO-2019103794 A1 *  5/2019  ............... H04L 9/30

OTHER PUBLICATIONS

Amoretti et al., "Blockchain-based Proof of Location", IEEE, 2018, 13 pgs, DOI: 10.1109/QRS-C.2018.00038.

(Continued)

*Primary Examiner* — Mahendra R Patel
(74) *Attorney, Agent, or Firm* — Kerr IP Group, LLC (57) ABSTRACT

The system and method include a wireless client device, a cloud component, a gateway component, a geofence, and a proof of geofence (PoG) protocol. The PoG protocol continuously generating a PoG contract when the authenticated wireless client device is within the geofence. The PoG contract includes generating, by the gateway component, a PoG certificate that includes a mobile device public key, and a hash of a previous PoG contract. Also, the PoG contract requires the wireless client device to separately generate the PoG certificate within a time period with one or more mobile device sensors that includes a gateway component public key and the hash of the previous PoG contract. Additionally, the PoG contract records one or more signatures when the wireless client device generates the PoG certificate. A PoG ledger is then updated with each PoG contract.

17 Claims, 8 Drawing Sheets

(56) References Cited

U.S. PATENT DOCUMENTS

| | | | |
|---|---|---|---|
| 12,072,963 B2* | 8/2024 | Dange | G06F 21/32 |
| 12,081,979 B2* | 9/2024 | Muthusamy | H04L 63/0884 |
| 12,101,408 B2* | 9/2024 | Nagandla | H04L 9/3213 |
| 12,132,609 B2* | 10/2024 | Smith | H04W 12/69 |
| 12,140,927 B2* | 11/2024 | Small | G06Q 50/184 |
| 12,192,183 B1* | 1/2025 | Kerr | H04L 12/66 |
| 2004/0192438 A1* | 9/2004 | Wells | G06F 21/32 463/29 |

OTHER PUBLICATIONS

Dasu et al., "Unchain Your Blockchain", Symposium on Foundations and Applications of Blockchain (FAB '18), 2018, 8 pgs.

Kounas et al, "QuietPlace: an Ultrasound-Based Proof of Location Protocol with Strong Identities", Applied System Innovation, 2020, 28 pgs.

Lyu et al, "CLIP: Continuous Location Integrity and Provenance for Mobile Phones", IEEE 12th International Conference on Mobile Ad Hoc and Sensor System, 2015, 9 pgs.

Nakamoto, "Bitcoin: a Peer-to-Peer Electronic Cash System", (Aug. 21, 2008). Available at SSRN: https://ssrn.com/abstract=3440802 or http://dx.doi.org/10.2139/ssrn.3440802.

Zhanikeev, "The Last Man Standing Technique for Proof-of-Location in IoT Infrastructures at Network Edge", Wireless Communications and Mobile Computing, 2019, 13 pgs, vol. 2019, https://doi.org/10.1155/2019/7317019.

* cited by examiner

PROOF OF GEOFENCE

FIELD

A location-based consensus mechanism that includes a continuous location-based authentication component, which is referred to as Proof of Geofence (PoG), is described. The consensus mechanism, which achieves agreement on the state of the blockchain and ensures the validity and security of the blockchain, is based on continuously authenticating the proximity of the client device to a PoG gateway component.

BACKGROUND

Consensus mechanisms and authentication serve important roles in the context of blockchain and other distributed systems, however, these concepts are treated as distinct concepts with different purposes.

A consensus mechanism ensures agreement among participants in a decentralized network regarding the validity and order of transactions. It allows multiple nodes to reach a consensus on the state of the blockchain and prevent malicious actors from tampering with the ledger. Consensus mechanisms enable the network to operate in a trustless manner, without relying on a central authority. They determine how new blocks are added to the blockchain and how conflicts or forks are resolved.

Authentication, on the other hand, is the process of verifying the identity or credentials of an entity to establish trust and grant access to a system or resource. It confirms the authenticity and integrity of a user or device. Authentication methods can include passwords, cryptographic keys, biometrics, or multi-factor authentication. Authentication ensures that only authorized individuals or entities can access a system, perform certain actions, or submit transactions.

Thus, consensus mechanisms focus on achieving agreement and consensus among network participants, authentication focuses on verifying the identity or credentials of individual users or devices. They serve different purposes within a blockchain or distributed system, but they work together to establish a secure and trustworthy environment for transactions and interactions.

There are several common consensus mechanisms used in blockchain networks. Consensus mechanisms are designed to achieve agreement on the state of the blockchain and ensure the validity and security of transactions.

Proof of Work (PoW) is the most well-known consensus mechanism, used by Bitcoin and many other cryptocurrencies. Miners compete to solve complex mathematical puzzles, and the first one to find the solution broadcasts it to the network. The solution is verified, and the miner is rewarded with new coins. PoW requires a significant amount of computational power and energy consumption.

Proof of Stake (PoS) is a consensus mechanism where validators are chosen to create new blocks based on the number of coins they hold and are willing to "stake" as collateral. Validators are selected randomly, but the probability of selection is proportional to their stake. PoS requires validators to have a certain number of coins in their wallets, which are locked up as collateral during the validation process. PoS is less energy-intensive compared to PoW.

Delegated Proof of Stake (DPoS) is a variation of PoS where token holders vote for a limited number of delegates to produce blocks on their behalf. These delegates, also known as witnesses or validators, take turns creating blocks. DPOS provides fast block confirmation times and scalability, but it is considered more centralized because a small group of delegates has significant power.

Practical Byzantine Fault Tolerance (PBFT) is a consensus mechanism designed for permissioned blockchains where the network participants are known and trusted. It uses a voting process to reach a consensus on the validity of transactions. PBFT requires a two-thirds majority of participants to agree on a proposed transaction before it is added to the blockchain. PBFT is fast and efficient but may have limitations in terms of scalability and security in open and decentralized networks.

Proof of Authority (PoA) is a consensus mechanism where block validators are identified and authorized by a central authority or a group of authorities. Validators take turns creating blocks, and their identities are known and trusted. PoA provides fast block confirmation times and is energy-efficient but sacrifices some decentralization and censorship resistance.

Proof of Elapsed Time (PoET) is a consensus mechanism used in some permissioned blockchain networks. PoET leverages a trusted execution environment (TEE) to randomly select a validator node to create a new block. Validators are required to wait for a randomly generated "wait time" before proposing a block. PoET aims to achieve fairness and energy efficiency.

There isn't a widely recognized or commonly used consensus mechanism specifically based on location. However, some blockchain projects have explored the concept of location-based services or incorporating location data into their consensus mechanisms. For instance, certain applications or smart contracts built on blockchain platforms may utilize location data as an input for specific functionalities, which could involve verifying the location of a transaction or validating the proximity of participants for specific interactions. These location-based functionalities typically operate within the broader consensus mechanism employed by the blockchain network rather than being a standalone consensus mechanism themselves. The fundamental agreement on the state of the blockchain is still achieved through the primary consensus mechanism in use, and location-based services may provide additional context or functionality within that framework.

A system and method are proposed that combines the consensus mechanism and authentication process into a location-based consensus mechanism that includes a continuous location-based authentication component, which is referred to as Proof of Geofence (PoG).

SUMMARY

A proof of geofence system and method is described. The proof of geofence system and method authenticates a client device and a location of the client device in relation to a gateway component. The proof of geofence method authenticates the client device, which includes a short-range wireless radio. The method authenticates the gateway component location, in which the gateway component includes a gateway short range wireless radio.

A proof of geofence contract is generated when the authenticated client device short range wireless radio communicates with the gateway short range wireless radio. The proof of geofence contract includes the user biometric, a gateway proof of geofence certificate, and a client proof of geofence certificate. The gateway component generates a gateway proof of geofence certificate for the proof of geofence contract. The gateway proof of geofence certificate includes a gateway timestamp, a client device public key, and a hash of a previous geofence contract. The client device generates the client device proof of geofence certificate within a predetermined time period with one or more client device sensors for the proof of geofence contract. The client device proof of geofence certificate includes a client timestamp, a gateway component public key, and the hash of the previous geofence contract. A proof of geofence ledger is updated with each proof of geofence contract when the client proof of geofence certificate is approximately similar to the gateway proof of geofence certificate.

In one embodiment, the method includes a further step of authenticating a user biometric associated with at least one of the client device and the gateway component.

In another embodiment, the proof of geofence method is required to provide access to at least one of an application, a document, a file, and a link for the predetermined time period when the client proof of geofence certificate is approximately similar to the gateway proof of geofence certificate.

In yet another embodiment, the proof of geofence method repeatedly generates a separate proof of geofence contract after each predetermined time period has expired.

In a further embodiment, the proof of geofence method stores the updated proof of geofence ledger at one of a verifier component, the gateway component, and the cloud component.

In a still further embodiment, the proof of geofence method enables the gateway component to communicate with a cloud component and enabling the client device to communicate with the cloud component.

In an even further embodiment, the proof of geofence method generates one or more digital signatures when the client device generates the client proof of geofence certificate within the predetermined time period and the client proof of geofence certificate is approximately similar to the gateway proof of geofence certificate. The method may also record one or more digital signatures at one of the gateway and the cloud component.

A system for generating a proof of geofence contract is described. The system includes a wireless client device, a cloud component, and a gateway component. The wireless client device is communicatively coupled to the cloud component. The wireless client device includes a biometric input component, and the wireless client device includes a short-range wireless radio. The gateway component is communicatively coupled to the cloud component, wherein the gateway component includes a gateway location and a gateway short range wireless radio. A geofence generated by the gateway component, in which the gateway short range wireless radio communicates with the wireless client short range wireless radio.

The proof of geofence protocol includes, initially, authenticating the wireless client device and a user biometric and authenticating the location of the wireless client device based on the gateway short range wireless radio communicating with the wireless client short range wireless radio.

The proof of geofence protocol then proceeds to continuously generate a proof of geofence contract when the authenticated wireless client device is within the geofence. In operation, the gateway component generates a proof of geofence certificate. The wireless client device then separately generates another proof of geofence certificate within a time period with one or more mobile device sensors. The proof of geofence protocol then records one or more signatures when the wireless client device successfully generates the proof of geofence certificate, which closely matches the gateway component proof of geofence certificate. A proof of geofence ledger is updated with each proof of geofence contract.

In one system embodiment, the system includes a verifier component that is communicatively coupled to the cloud component. The verifier component monitors the short-range wireless communications between the wireless client device and the gateway component.

In another embodiment, the proof of geofence certificate is generated by the gateway component includes a timestamp, a mobile device public key, and a hash of a previous proof of geofence contract.

In yet another embodiment, the wireless client device separately generating the proof of geofence certificate within the time period with one or more mobile device sensors includes the timestamp, a gateway component public key, and the hash of the previous proof of geofence contract.

FIGURES

The present invention will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus, systems and methods described herein may vary as to configuration and as to details. Additionally, the systems and methods may vary as to details, order of the actions, or other variations without departing from the illustrative methods disclosed herein.

A system and method that combines a consensus mechanism with an authentication process is described. More specifically, a location-based consensus mechanism that includes a continuous location-based authentication component referred to as Proof of Geofence (PoG) is described. The PoG consensus mechanism, which achieves agreement on the state of the blockchain and ensures the validity and security of the blockchain, is based on continuously authenticating the proximity of the client device to a PoG gateway component.

By way of example and not of limitation, the PoG apparatus, systems and methods described are used to prevent trade secret misappropriation. From a cyber security perspective, the PoG apparatus, systems and methods are used to mitigate the insider threat attack vector and minimize the attack surface.

More specifically, the intellectual property (IP) owner identifies a trade secret or confidential information in at least one of a file, a folder, or a link. Generally, the IP owner has a document classification process and has implemented procedures to control the access to the trade secrets and confidential information. Note, although reference is made to trade secrets, the systems and methods described herein can also be applied to confidential information. The difference between trade secrets and confidential information may depend on the specific circumstances, however, for purposes of this patent, trade secrets are accessed by employees or particular independent contractors. "Confidential Information" may be accessed by individuals or corporate entities that operate independently of the employees or particular independent contractors.

Thus, the PoG systems and methods described herein may be used to secure documents, links, and files within a local geofence and then tracks users entering and leaving the local geofence. Additionally, the PoG systems and methods may limit access to particular individuals and/or entities such as employees, an independent contractor, a joint venture partner, a supplier, a regulatory agency, a general contractor, a subcontractor, or other such third party.

Figure 1:
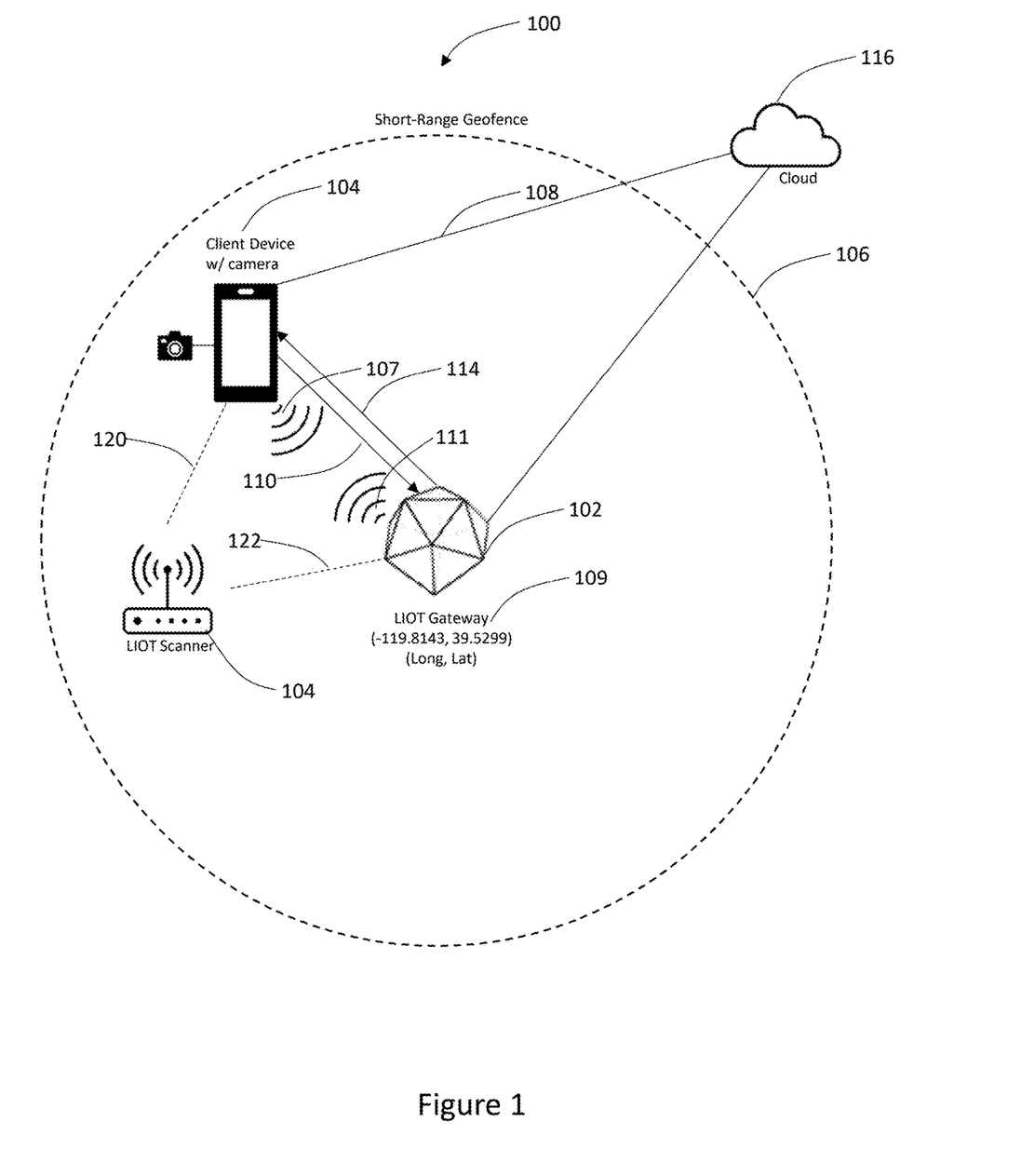
FIG. 1 shows a simplified proof of geofence (PoG) system with a PoG Gateway.

Referring to FIG. 1, there is shown a simplified PoG system 100. The PoG systems and methods described herein are manufactured by LoyaltyIOT, Inc. based in Reno, Nevada. The PoG system 100 generates a Proof of Geofence.

PoG system 100 includes a wireless client device 104, a cloud component 116, and a gateway component 102. The wireless client device 104 is communicatively coupled to the cloud component 116. The wireless client device 104 includes a biometric input component 105 (e.g., a camera) and a short-range wireless radio 107.

The gateway component 102 is communicatively coupled to the cloud component 116. The gateway component 102 includes a gateway location 109 and a gateway short range wireless radio 111. A geofence 106 is generated by gateway component 102, in which the gateway short range wireless radio 111 communicates with the wireless client short range wireless radio 107.

Figure 5A:
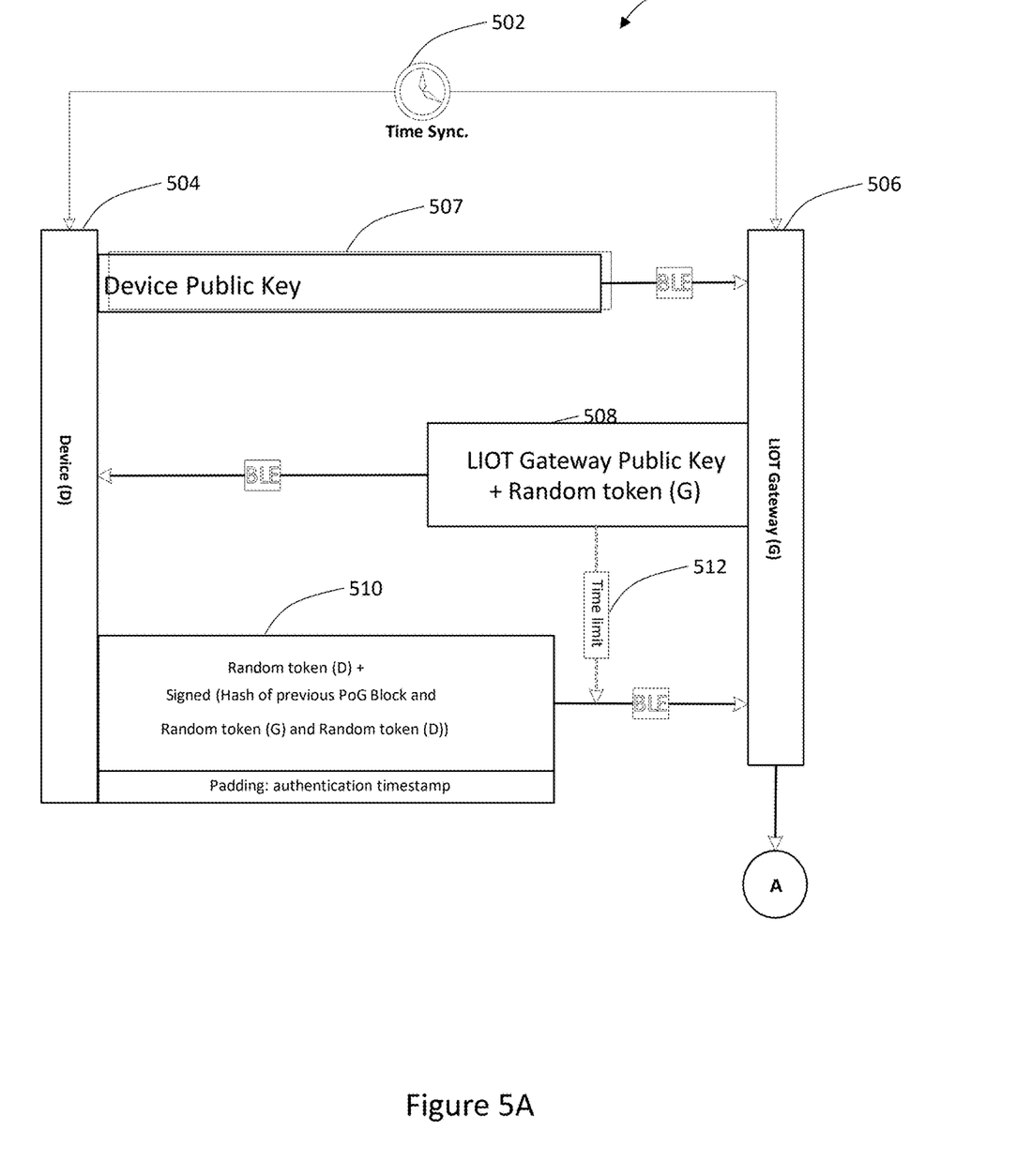
FIG. 5A shows a block drawing of an initial authentication process for PoG.

Initially, the proof of geofence protocol authenticates the wireless client device 104 and a user biometric gathered from the client biometric input component 105 as described in FIG. 5. The initialization process includes authenticating the location of the wireless client device 104 based on the gateway short range wireless radio 111 communicating with the wireless client short range wireless radio 107.

The proof of geofence protocol then proceeds to continuously generate a proof of geofence contract when the authenticated wireless client device 104 is within geofence 106. In operation, the gateway component 102 generates a proof of geofence certificate. The wireless client device 104 then separately generates another proof of geofence certificate within a time period with one or more mobile device sensors.

The proof of geofence protocol then records one or more signatures when the wireless client device 104 successfully generates the proof of geofence certificate, which closely matches the gateway component proof of geofence certificate. A proof of geofence ledger is updated with each proof of geofence contract.

In one system embodiment, the system includes a verifier component 118 which may operate as a local cloud component in an air gapped embodiment. The verifier component 118 may also be communicatively coupled to the remote cloud component 116. The verifier component 118 monitors the short-range wireless communications between the wireless client device 104 and the gateway component 102.

In another embodiment, the proof of geofence certificate is generated by gateway component 102 includes a timestamp, a mobile device public key, and a hash of a previous proof of geofence contract.

In yet another embodiment, the wireless client device 104 separately generating the proof of geofence certificate within the time period with one or more mobile device sensors includes the timestamp, a gateway component public key, and the hash of the previous proof of geofence contract.

The PoG operations described herein to successfully generate a block, the user's wireless device 104 must be within this short-range radio geofence 106 generated by the PoG gateway 102. If the user's wireless device 104 is outside the geofence 106, then the wireless device 104 cannot communicate with the gateway 102 and a PoG block cannot be generated.

In the illustrative embodiment, the PoG system 100 communicates using a "dual channel location-based authentication process," which is also referred to in this patent as a "continuous location-based authentication." Note, continuous location-based authentication does not require two channels, however, the dual channel location-based authentication process does require two or more communication channels. Thus, there may be instances in this patent where embodiments may operate using a single channel or using two or more communication channels.

In one embodiment, the dual channel location-based authentication process requires the client device 104 to communicate along a first broadband channel 108 and a short-range channel 110. Secondly, the dual channel location-based authentication process requires the PoG gateway 102 to communicate along a second broadband channel 112 and a short-range channel 114. In certain embodiments, the short-range channel 110 and short-range channel 114 may be separate channels, or short-range channels 110 and 114 may be a shared channel. Also, the broadband channels may be separate channels and/or a shared broadband communications channel that supports secure communication with a LIOT cloud component 116.

By way of example and not of limitation, the short-range communication channel may be one of Wi-Fi, Bluetooth, Bluetooth Low Energy (BLE) and other such short-range communication protocols. The illustrative broadband communications provide a wireless wide area network transmission and reception channel that maybe implemented as a 4G network, a 5G network, a optical fiber communication channel, a DSL communications channel, a DOCSIS compliant cable communication channel and other such broadband communications channels.

The verifier component 118 may operate similarly to remote cloud 116 when communications with LIOT cloud 116 are interrupted; thus, the verifier component 118 allows the PoG blockchain to be generated when broadband communications to the remote cloud 116 have failed. This air-gapped embodiment provides redundancy in battlefield environments or other locations with cybersecurity threats.

The verifier component 118 communicates along short-range channel 120 and short-range channel 122 mimics the communications along broadband communication channel 108 and broadband communication channel 112, respectively. Thus, the verifier component operates as a hyper-local cloud when broadband communications have been compromised or the systems have been air gapped for security reasons.

Verifier component 118 operations are dependent on the verifier component computing resources such as RAM, memory, CPU resources, and short-range communications bandwidth. Additionally, the illustrative verifier component 118 includes a scanner that scans the local area for short-range wireless communication signals generated by authenticated wireless devices and non-authenticated wireless devices. The verifier component 118 may also be communicatively coupled to the cloud component 116 and provide results from scans of the local area. Also, the verifier component can generate a log of each failed attempt to generate a proof of geofence contract.

The illustrative application for the PoG apparatus, systems and methods described herein is to prevent trade secret misappropriation and/or mitigate the impact of the insider threat. For example, an owner of trade secrets gives an employee a PoG gateway that is used to inter alia authenticate the location of the employee. An illustrative encrypted document, an encrypted file, or an encrypted link is sent to the employee that can only be decrypted if the employee is near the PoG gateway.

Note, for purposes of this patent reference is made to an illustrative encrypted document. However, the illustrative encrypted document may also be an encrypted file or an encrypted link that can be associated with a folder or a file, respectively. For brevity, reference is made to an "encrypted document."

During the illustrative application which accesses the trade secret document, the PoG gateway repeatedly passes a decryption key using a short-range wireless radio. This authentication process happens continuously (e.g., every minute) and is recorded in a blockchain ledger. The blockchain ledger provides a "chain of custody" of ALL the people, devices, location, and times that the illustrative trade secret document was accessed.

If any alerts are triggered-decryption keys are NOT sent to the gateway-so the trade secret can NOT be viewed by the employee. Also, any encrypted document that is taken out of PoG gateway geofence cannot be viewed because of lack of proximity to the continuously updated PoG gateway decryption key.

The Proof of Geofence (PoG) consensus mechanism authenticates the user is within the PoG gateway geofence and then builds a chain-of-custody blockchain ledger. The chain-of-custody blockchain ledger may include one or more of the following variables: the time the file/document/link was accessed, the user device that accessed the document, a user biometric hash, and/or the user location.

Thus, the PoG consensus mechanism includes a continuous location-based authentication process that relies on a location-based authentication solution that operates by continuously authenticating the user's client device 104 (e.g., mobile wireless device, PC, or laptop) and the user's client device proximity to a PoG gateway 102.

The illustrative encrypted document is transmitted to the user along the first communication channel. The decryption keys are transmitted from a nearby PoG gateway using a short-range Bluetooth radio along the second communication channel. The encrypted document can only receive the decryption key(s) when the user's client device is within the Secure Geofence (SG) associated with the PoG gateway.

Figure 2:
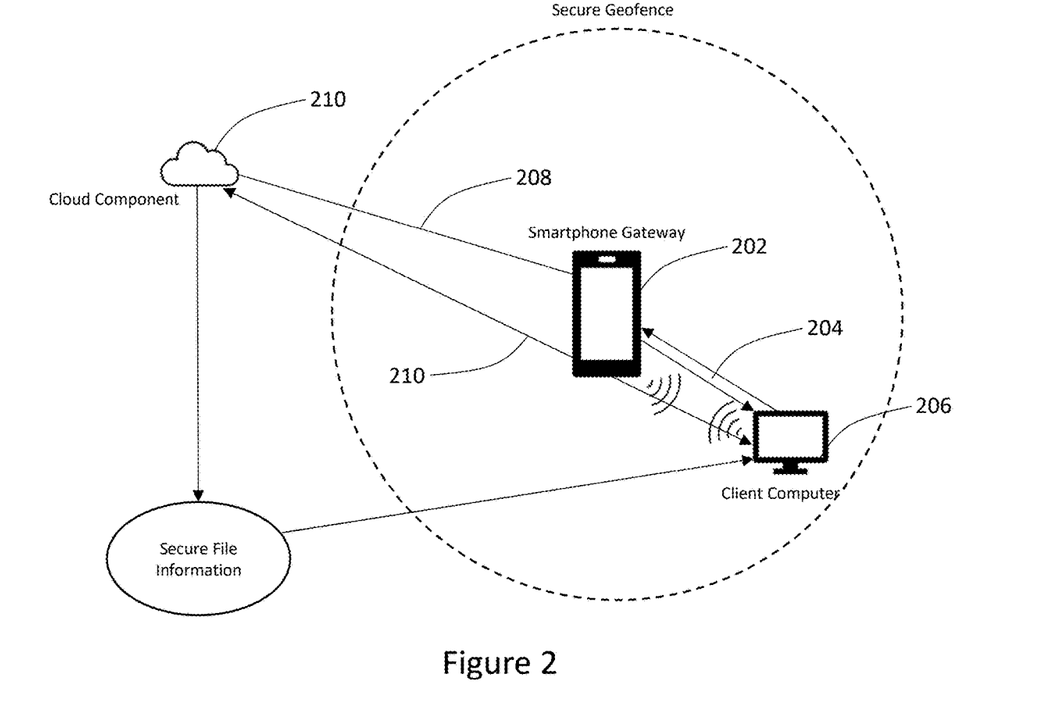
FIG. 2 shows a smartphone app operating as a PoG Gateway.

Referring to FIG. 2, there is shown an illustrative smartphone 202 that includes a downloaded smartphone app that operates as a PoG gateway. The illustrative PoG gateway smartphone app provides a dual channel location-based authentication process like PoG gateway 102 described above.

In an illustrative embodiment, the illustrative short-range communications channel 204 between the for the smartphone 202 and the client device 208 is a BLE communication channel. The broadband communications channel 208 is associated with smartphone gateway 202 communicating with LIOT cloud component 210. The broadband communications channel 212 corresponds to the client computer 206 communicating with the LIOT cloud component 210. Client computer 206 may be a stationary workstation, a laptop, a tablet, a smartphone, or any other such client device.

Figure 3:
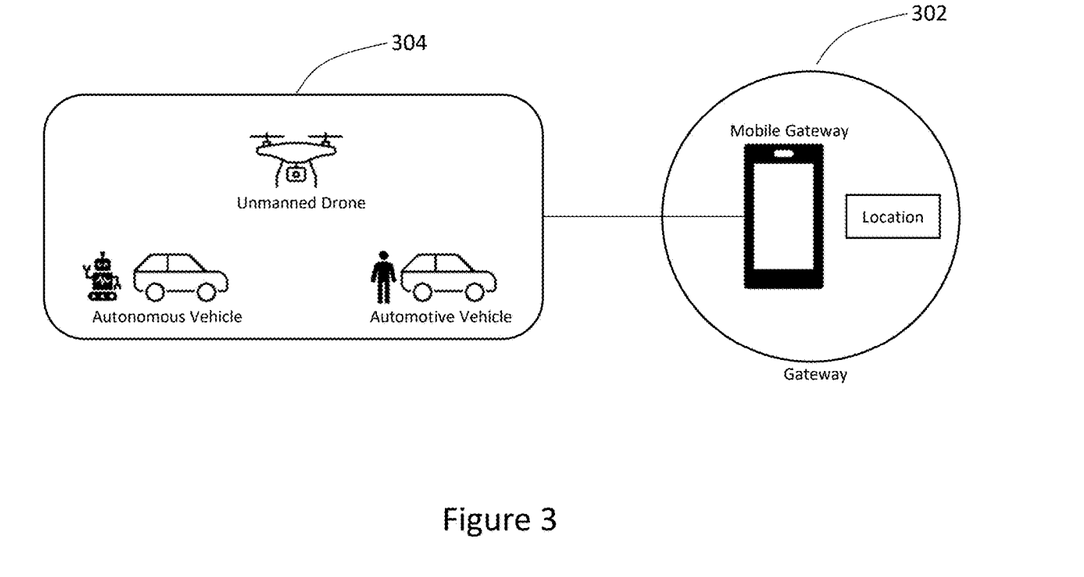
FIG. 3 shows an embedded PoG Gateway in a moving vehicle.

Referring to FIG. 3, there is shown a mobile PoG gateway 302 associated with a moving vehicle 304. In this illustrative embodiment, the PoG gateway 302 is not stationary as shown in FIG. 1 or is not associated with a user's personal smartphone 202. Instead, the PoG gateway is present in an electric vehicle that is driven autonomously or driven by a human driver. Also, the PoG gateway maybe associated with an unmanned drove. The illustrative mobile PoG gateway 302 includes radios that support short-range wireless communications and broadband communications. Additionally, the PoG gateway 302 operates as described in this patent.

Figure 4A:
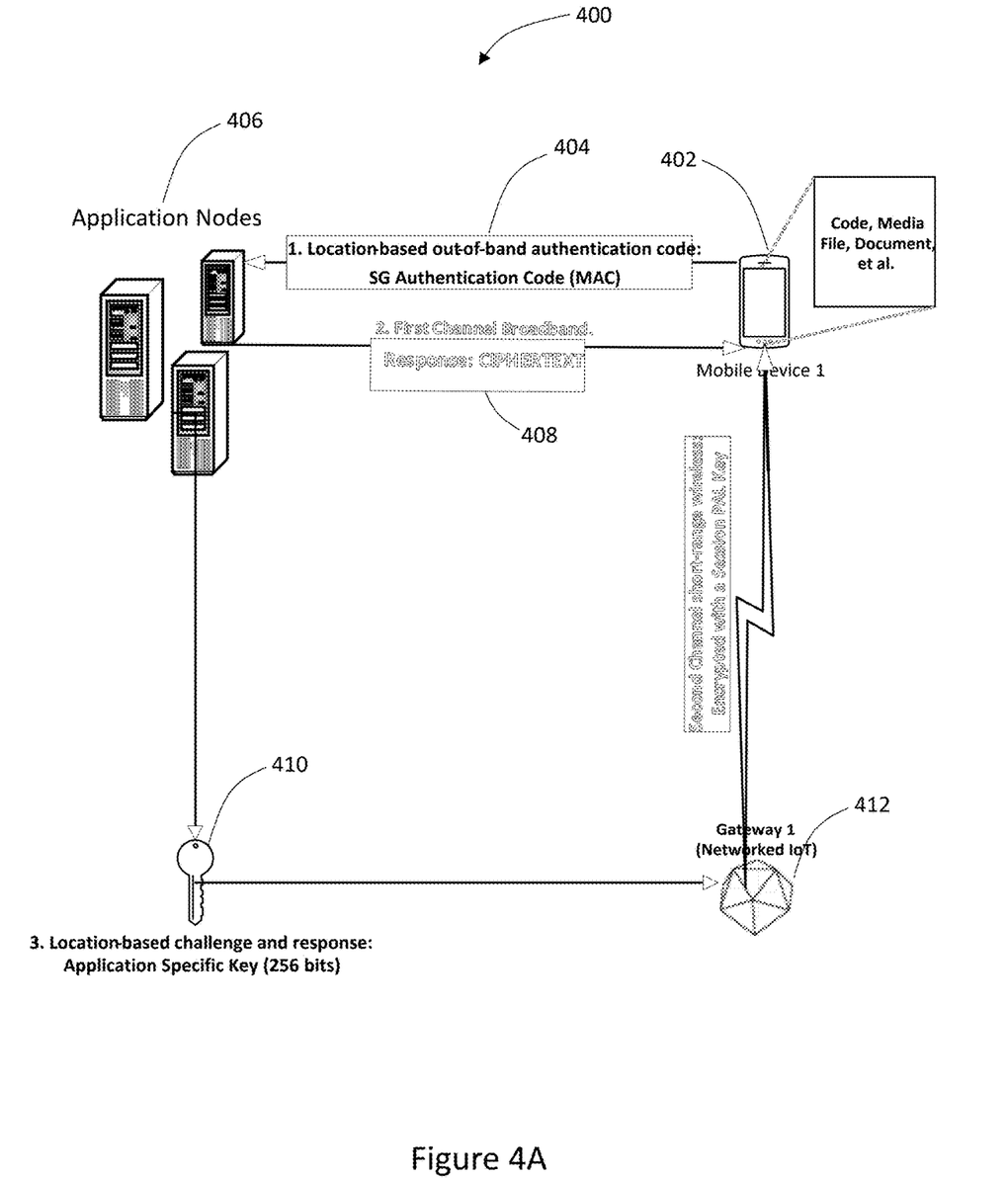
FIG. 4A shows a block drawing showing a key exchange process taking place and a dual-channel authentication process.

Referring to FIG. 4A, there is shown a block drawing of an illustrative key exchange process associated with dual-channel location-based authentication. In the block drawing 400, a client device 402 sends an authentication code 404 to one or more cloud components 406, which are represented as Application Nodes; this communication occurs over a broadband channel unless the communication is with the PoG verifier as described above.

Returning the broadband cloud 406 embodied as Application Nodes having received the authentication code 404 the block drawing shows with a response 408 that includes ciphertext, which is sent to the client device 402. To decrypt this ciphertext, the cloud 406 also sends the decryption key 410 for the ciphertext to the PoG gateway 412. The PoG gateway 412 then relays this decryption key to the client device over a short-range BLE connection.

Figure 4B:
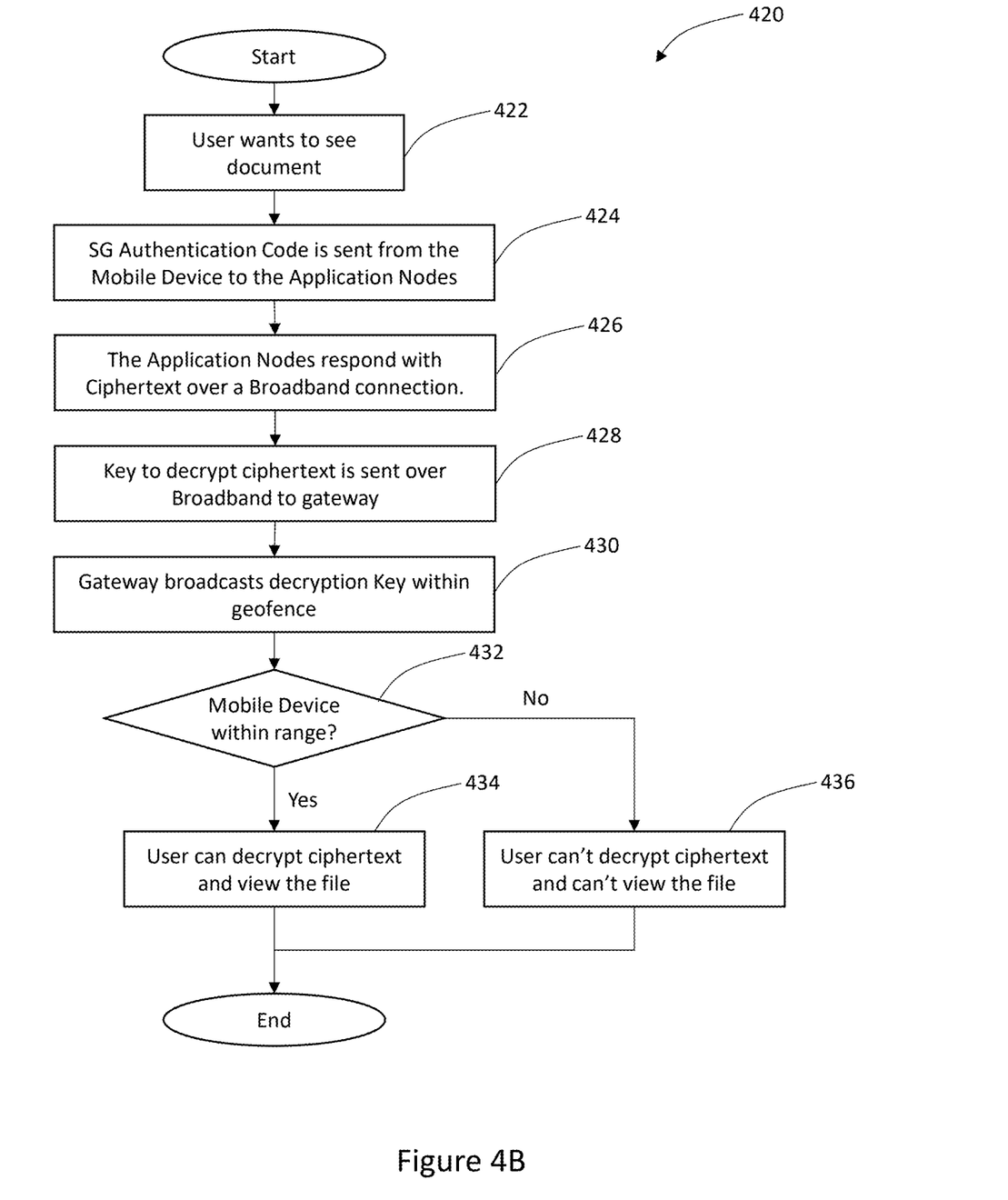
FIG. 4B shows a flowchart for the key exchange process described in FIG. 4A.

Referring to FIG. 4B, there is shown a method flowchart for the key exchange process described in FIG. 4A. The illustrative dual-channel location-based authentication method 420 is initiated at block 422 where the user selects a document that they want to view. The method then proceeds to block 424 where an authentication code is transmitted from the mobile client device 402 to the LIOT cloud 406 Application Nodes.

At block 426, the LIOT cloud 406 Application Nodes encrypts the selected file and communicates the resulting ciphertext to the client device with a broadband connection. Note, for purposes of this patent the term "ciphertext" and "encrypted file" are used interchangeably. Those of ordinary skill in the art shall appreciate that ciphertext, or encrypted text, is a series of randomized letters and numbers which humans cannot read; and an encryption algorithm receives a plaintext message, subjects the plaintext to an encryption algorithm and produces a ciphertext. The ciphertext can be reversed through the process of decryption to produce the original plaintext. Plaintext refers to human readable text that may be embodied as a human readable sentence, a script, programming source code, or other such written text.

At block 428, the decryption key for the ciphertext is communicated to the gateway with the same broadband connection or a separate broadband channel. Thus, the decryption key is sent along a separate communication path to the gateway, and the encrypted file is sent to the client device requesting to view the file.

At block 430, the gateway broadcasts the decryption key for the ciphertext. The broadcast area for the gateway is referred as a "geofence." In the illustrative embodiment, the gateway transmits the decryption key using a short-range wireless radio such Bluetooth Low Energy (BLE). Note, the gateway broadcast signal strength may be modified remotely by the LIOT cloud; thus, the size of the geofence can be centrally controlled from the LIOT cloud.

At decision diamond 432, a determination is made whether the client device is within the broadcast range of the gateway, which is also referred to as the "gateway geofence." The client device must have a similar radio as the gateway to receive the decryption key.

If the client device is within range of the gateway, then the method proceeds to block 434 where the decryption key is received by the client device. The client device decrypts the ciphertext, so the selected file is human readable.

At block 436, the client device is not within range of the gateway, so the decryption key is not received by the client device and the encrypted document is not viewable.

In this patent, the Proof of Geofence (PoG) metadata associated with the dual-channel location-based authentication process may be stored in the PoG blockchain or the metadata may be stored in a relational database. The precise implementation depends on the amount and type of metadata. For example, if the metadata dataset is a large dataset, then a relational database may be used. If the metadata memory requirements are very small, then the metadata may be stored in the PoG blockchain.

Figure 5B:
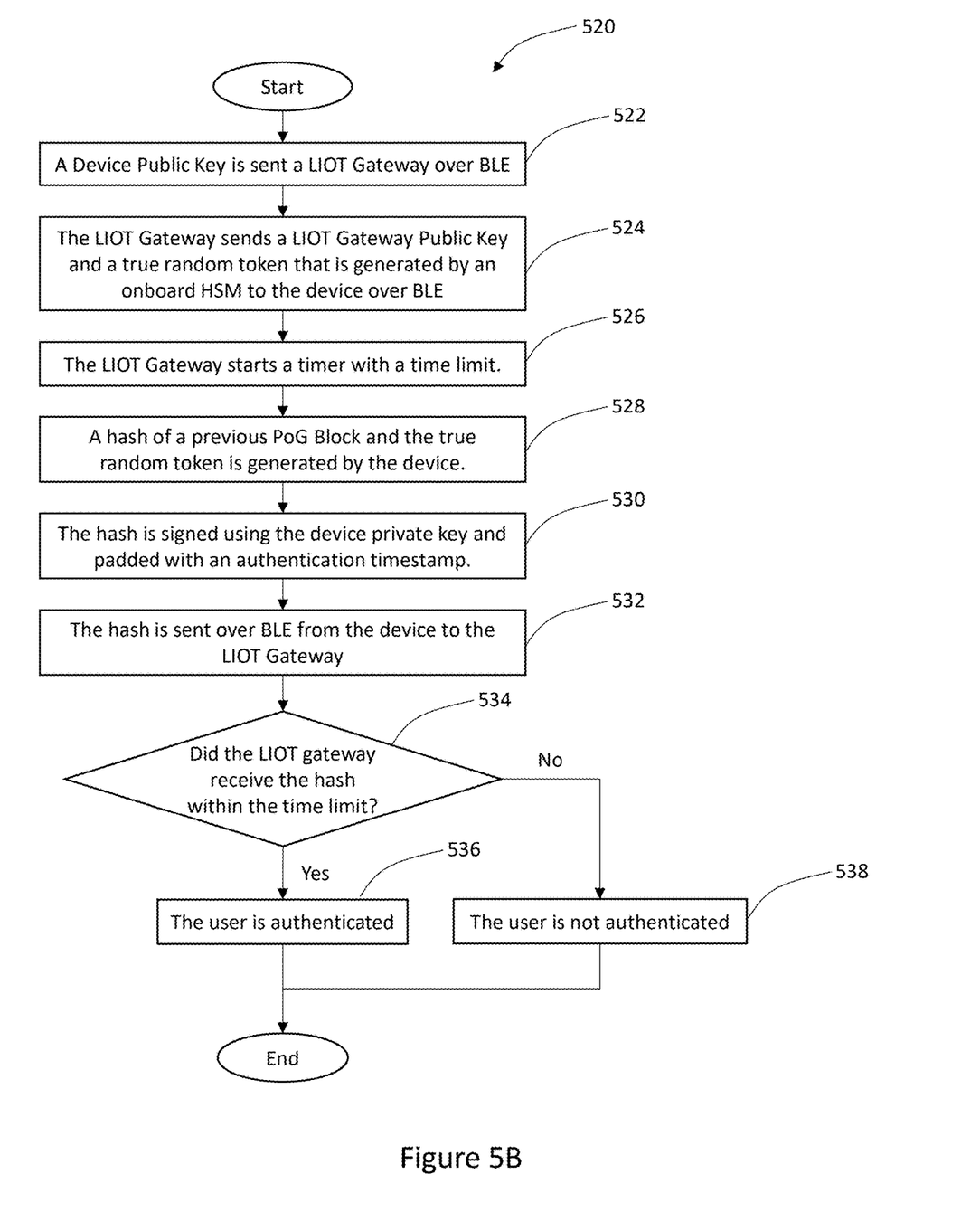
FIG. 5B shows a flowchart for the initial authentication process for PoG described in FIG. 5A.

Referring to FIG. 5A, there is shown a block drawing 500 of an initial PoG authentication process between the client device 504 and a PoG gateway 506. The purpose of this initial authentication process is to authenticate the client device 504 by receiving various authentication information from the client device. Note, the PoG gateway 506 has previously been authenticated. FIG. 5A more clearly identifies the system component and operations thereof. FIG. 5B provides a flowchart of the initial authentication process in FIG. 5A.

Before the communication steps between the client device 504 and a PoG gateway 506, a time synchronization step 502 is initiated between client device 504 and a PoG gateway 506. The key exchange process in FIG. 5A and FIG. 5B uses a short-range radio such as BLE and the keys are exchanged with an illustrative BLE communication channel.

Once the time is synchronized between the client device and the PoG gateway, the client device sends a device public key 507 to the PoG gateway over the BLE connection. The client device also includes a client device private key, which is used to generate the digital signatures described in further detail below. It is well known to those of ordinary skill in the art that private keys are not shared, however, public keys are shared.

In response, the PoG gateway 506 transmits a PoG gateway public key 508 and a true random token generated by a hardware security module (HSM) over BLE to the device. The PoG gateway 506 also includes a PoG gateway private key, which is not shared and used for digital signatures as described in detail below. Additionally, the PoG gateway starts a timer 512. The PoG gateway may also set a time limit 512 for the timer, or the timer may have a preconfigured time limit.

The HSM is the PoG gateway is a physical hardware device that provide the user with the ability to generate and manage key material in a secure manner. The HSM generates and manages the key material. An HSM has internal cryptographic processes that allow HSM to generate and manage keys so others cannot access the key information. HSMs have multiple security features in place in order to prevent access to key material. HSMs also have tamper proof hardware that prevents an attacker from accessing key material. HSMs also have side channel attack resistance, which means that HSMs are resistant to certain types of scanning. Note, the user, server, or device that is connected to the HSM never receives the private key associated the HSM; only the HSM public key is shared. Although HSM's are effective at protecting key material and limiting access, they are ineffective against insider threats because once authenticated a user may perform nefarious actions.

The client device 504 then transmits a signed hash 510 of the previous PoG block and the true random token to the PoG gateway within a predetermined time limit. In the illustrative embodiment, the signed hash 510 and PoG gateway true random token are signed by a private key associated with the client device. The padding may include an authentication timestamp. If the signed hash and true random token are not within the prescribed time limit, the authentication step is terminated.

Referring to FIG. 5B, there is shown a flowchart for the initial authentication process for PoG described in FIG. 5A. Once the time is synchronized between the client device and the PoG gateway, the method is initiated at block 522 where the client device sends a device public key 507 to the PoG gateway over the BLE connection.

The method then proceeds to block 524 where the PoG gateway 506 transmits a PoG gateway public key 508 and a true random token generated by the HSM to the client device 504 over BLE to the device.

At block 526, the PoG gateway 506 starts a timer. The PoG gateway may also set a time limit 512 for the timer, or the timer may have a preconfigured time limit.

At block 528, a hash of a previous PoG block and the true random token is generated by the client device 504. The method then proceeds to block 530 where the hash is signed using the client device 504 private key and padded with an authentication timestamp.

At block 532, the signed hash 510 is communicated to the PoG gateway 506 using a short-range wireless protocol such as BLE. Thus, client device 504 transmits a signed hash 510 of the previous PoG block and the true random token to the PoG gateway within the predetermined time limit.

At decision diamond 534, a determination is made whether the PoG gateway 506 received the hash within the time limit. If the signed hash and the true random token are received within the predetermine time period, then the user's client device is authentication. If the signed hash and true random token are not received within the prescribed time limit, the authentication step is terminated, and the user's client device is not authenticated.

Figure 6:
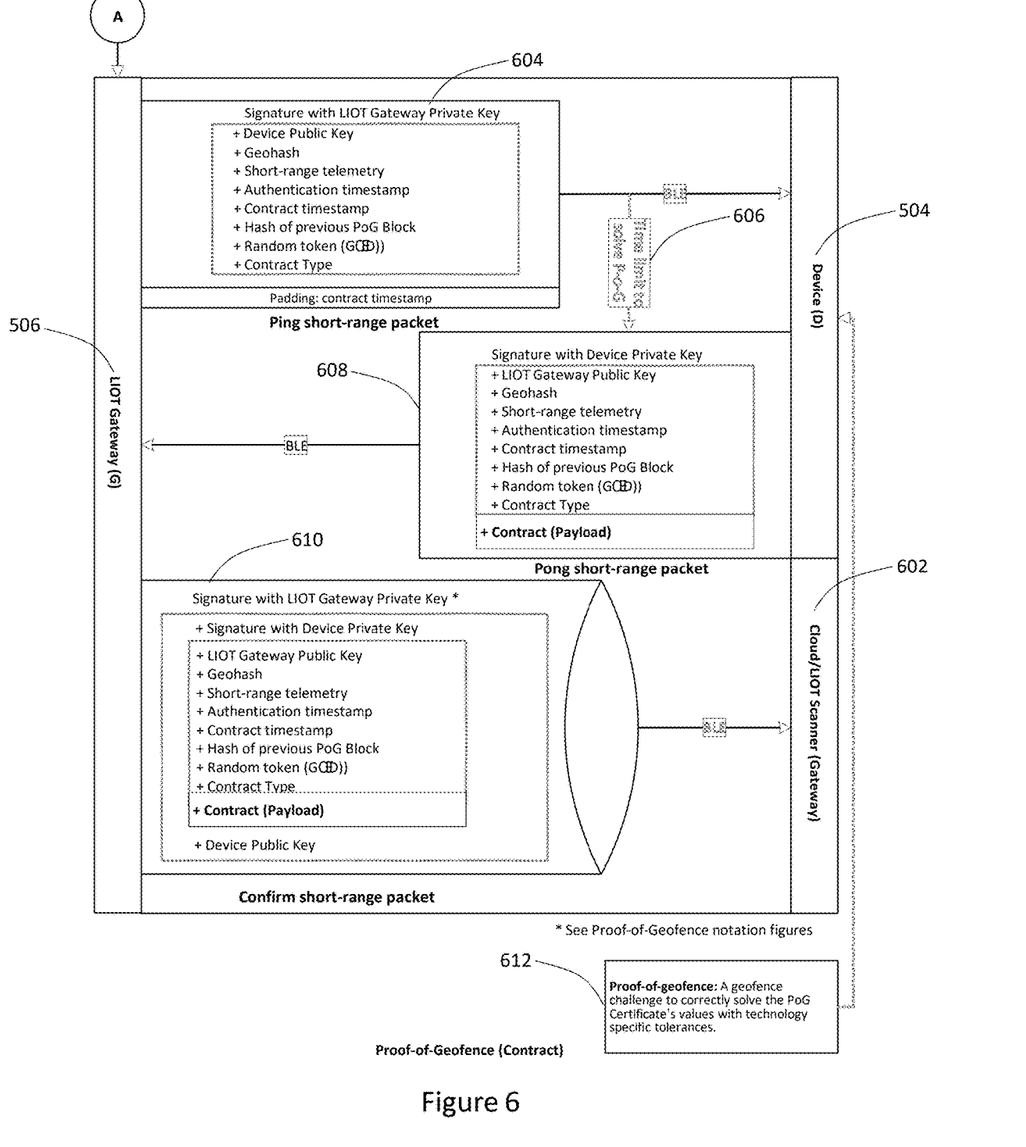
Referring to FIG. 6, there is shown a block drawing showing a continuous authentication process for PoG.

Referring to FIG. 6A, there is shown a block drawing of a PoG continuous authentication process that is performed after the initial authentication process for the client device described in FIG. 5. The continuous authentication process in FIG. 6 includes the client device 504, the PoG gateway 506, and a cloud component 602.

In the illustrative embodiment, the cloud component 602 is embodied as a remote cloud component that is communicatively coupled with a broadband connection to the PoG gateway 506 and the client device 504. In an additional embodiment, the cloud component may include a local cloud component that is communicatively coupled to PoG gateway 506 and client device 504 via a short range wireless transceiver capable of running a communication protocol such as BLE; this embodiment is referenced above as the verifier component 118 (shown in FIG. 1) and can operate as a buffer when broadband communications are lost.

In an alternative embodiment, the cloud component 602 may be embodied exclusively locally, so the PoG gateway may operate in an air-gapped battlefield environment. More specifically, the verifier component 118 may also include a large storage component (not shown) that may operate as a hyperlocal cloud server with radios that operate locally; this embodiment would not require broadband communications with a remote cloud.

In the illustrative embodiment, the PoG gateway 506 sends a PoG data packet 604 that includes a PoG gateway private key signature, which encrypts signature related data such as a device public key, a geohash, short range telemetry information, a contract timestamp, a hash of the previous PoG block, a random token, and a contract type. The PoG data packet 604 is also referred to as the "Ping short-range packet." This encrypted PoG data packet 604 data is sent over a BLE connection to the client device 504. A geohash is a representation of longitude and latitude in a short-range format. The PoG data packet 604 is concealed from the client device 504.

Those of ordinary skill in the art having the benefit of this disclosure shall appreciate that the PoG gateway private key is not shared and is used by the PoG gateway 506 to electronically sign PoG data packets 604; and the PoG public key, as previously described, is used by those who need to validate the electronically signed data packets. Thus, the signed PoG data packet 604 is concealed from the client device 504, even though it is generated by the PoG gateway 506.

During the continuous authentication process, client device 504 has a time limit 606 to generate a client device data packet 608. The time limit 606 operates as a programmable timer, in which the time period may be customized for different applications of PoG. For the illustrative document encryption application described herein, the programmable time limit to PoG may range from 1-10 seconds.

The client device 504 then proceeds to computationally generate a client data packet 608, which is similar to the concealed PoG data packet. The computed client data packet 608 is generated with information previously gathered in FIG. 5 and includes additional information such as a geohash, short range telemetry information, an authentication timestamp, a contract timestamp, and other such information. In the illustrative embodiment, the client device data packet 608 includes a signature generated using the device private key, which encrypts signature related data such as a PoG gateway public key, a geohash, short range telemetry information, an authentication timestamp, the contract timestamp, the hash of the previous PoG block, the random token, the contract type, and the contract itself. This packet is transmitted over the BLE connection to the PoG gateway.

The "work" performed in PoG occurs when two actions occur: firstly, the entry of client device into the PoG gateway geofence, which is described in FIG. 5. Secondly, the PoG gateway data packet 604 must closely match the client data packet 608 within the predetermined time interval 606.

Specific information in the PoG gateway data packet 604 must match data in the client device data packet 608, e.g., such as the random token and the hash of the previous PoG block.

However, some information in the data packets are not expected to match such as specific short range telemetry that includes signal strength information from either the client device or the PoG gateway. More specifically, the client device 504 may include a received signal strength information about the PoG gateway 506 and transmit power associated with client device 504; the PoG gateway 506 includes a received signal strength information about the client device 504 and transmit power associated with the PoG gateway 506. The short-range telemetry is not expected to match and if the short-term telemetry information matches, then either the PoG gateway or client device have been compromised and one or both devices are being mirrored—and the authentication fails. If the short-range telemetry information is not consistent and exceeds one or more boundary conditions, then either the PoG gateway or client device have been compromised and the authentication fails. For authentication to proceed, the short-term telemetry information must be within the appropriate ranges.

Thus, the PoG solution includes a "work" component that is embodied as a local work component where entry into a geofence is required and where certain parameters must be mirrored within a particular time and some parameters have to substantially similar but not precisely the same such as the short-range telemetry. Additionally, the challenge of passing the certificates using a short-range wireless channel such as BLE provides another form of work because packets may be dropped and the process may have to be repeated within the predetermined interval or else access to the illustrative document will be lost.

After the PoG gateway 506 receives the signed client data packet 609, the PoG gateway compares the concealed PoG data packet 604 with the computed client data packet 609 and determines if the packets are the same for certain variables, e.g., random token, and substantially similar for other variables, e.g., short-range telemetry. If the PoG data packet 604 and the client data packet 609 satisfy the precision test, in which certain variables are the same, and the substantial similarity test, in which certain variables are "close" enough in values, then the PoG certificate is validated.

Once the packets have been validated, a PoG certificate 610 is generated. The illustrative PoG certificate 610 includes the PoG gateway public key, the geohash, short range telemetry (e.g., BLE info), the authentication timestamp, the contract timestamp, the hash of the previous PoG block, the random token, the contract type, the contract payload, and the client device public key. Additionally, the PoG certificate includes a signature with the device private key and a signature with the PoG gateway private key.

This PoG certificate 610 is then communicated to the LIOT cloud component 602. The PoG certificate 610 operates as a new block that is added to the PoG blockchain.

Figure 7:
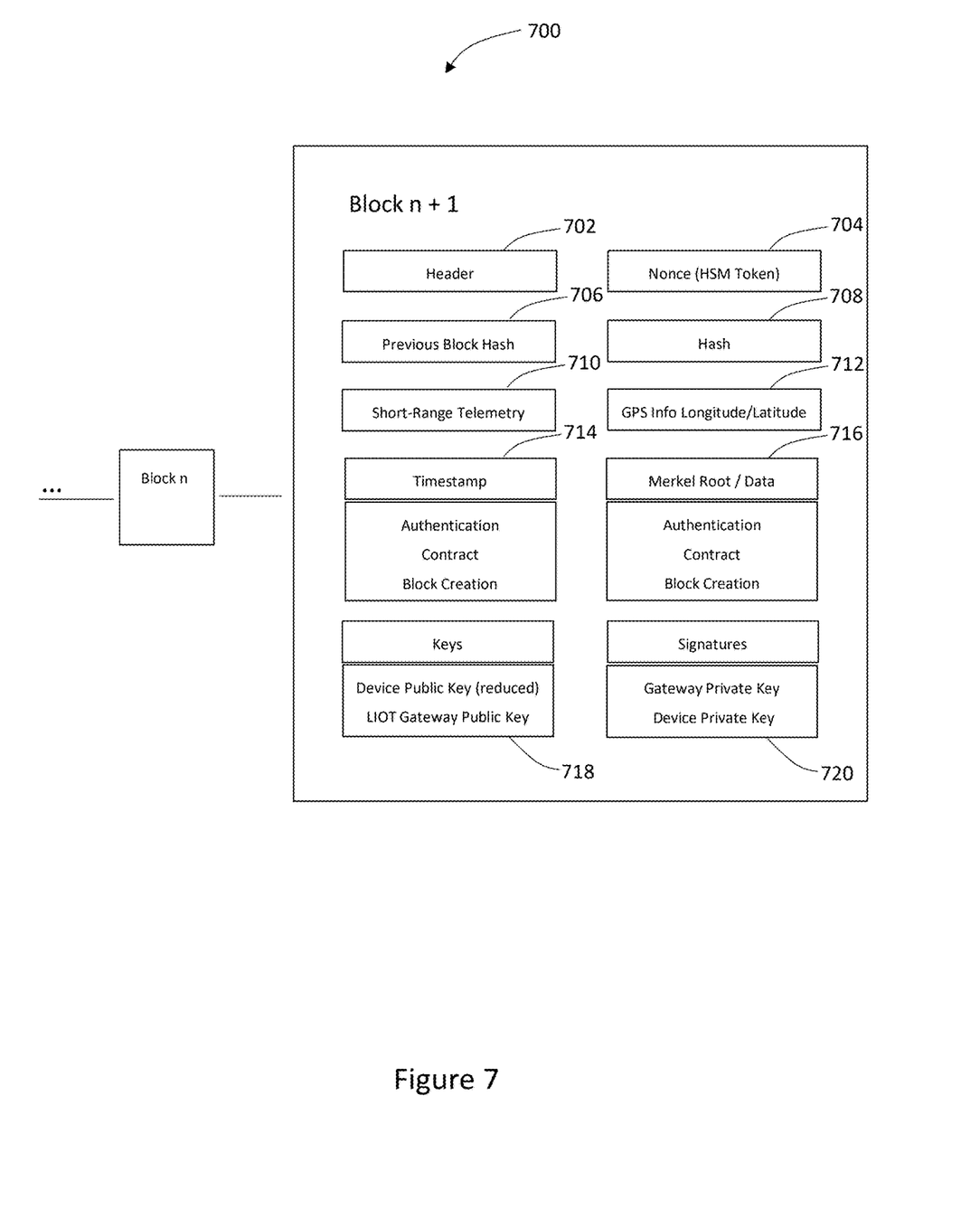
FIG. 7 shows an illustrative structure of individual PoG block objects.

Referring to FIG. 7, there is shown an illustrative structure of individual PoG block objects 700. The illustrative individual PoG blocks are then combined to generate the PoG blockchain. Each illustrative individual PoG block object has the following data fields: a header 702, a nonce 704, a previous block hash 706, the current block hash 708, short-range telemetry information 710, location information 712, an authentication timestamp, a contract timestamp, a block creation timestamp 714, a field for contract data that changes depending on the contract type 716, a device public key, a gateway public key 718, a device private key signature, and a gateway private key signature 720.

Generally, a blockchain is a distributed database solution that is unable to be changed, i.e., immutable database. In a blockchain, individual blocks store data and are linked together through their hashes. The hashes are generated from the actual block itself, using the header. The header of each block in a blockchain contains block metadata, which may include a timestamp, a nonce, a hash of the provided data, and the previous block hash. Since each block requires a previous block hash to be generated, this means that changes cannot be made to the blockchain. Each block has a hash and a previous block hash linking them together. The previous block hash is what links a block to the previous block. The current block also has a separate hash and the timestamp of the block creation. The nonce for the block can only be used once and is used for cryptographic hash functions. Additionally, each block includes a Merkle root hash, which is a hash of the of all the hashes of the data for each specific block. Thus, a blockchain is an immutable database because information in the blockchain cannot be changed or manipulated.

In the illustrative embodiment, every nonce generated by the PoG blockchain is generated by an HSM, which also generates the HSM key material referred to as an HSM token. This short-range telemetry includes BLE information used for communications between the PoG gateway and the client device. In the illustrative embodiment, location information is stored as a geohash. There are three timestamps in each block, namely, the block creation timestamp, a user authentication timestamp, and a contract timestamp.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A proof of geofence method that authenticates a client device and a location of the client device in relation to a gateway component, wherein the proof of geofence method comprises:
   authenticating the client device, which includes a client device short range wireless radio;
   authenticating a gateway component location, wherein the gateway component includes a gateway short range wireless radio;
   generating a proof of geofence contract when the authenticated client device short range wireless radio communicates with the gateway short range wireless radio, wherein the proof of geofence contract includes a user biometric, a gateway proof of geofence certificate and a client proof of geofence certificate;
   generating, by the gateway component, the gateway proof of geofence certificate for the proof of geofence contract,
      wherein the gateway proof of geofence certificate includes a gateway timestamp, a client device public key, and a hash of a previous geofence contract;
   generating, by the client device, the client device proof of geofence certificate within a predetermined time period with one or more client device sensors for the proof of geofence contract,
      wherein the client device proof of geofence certificate includes a client timestamp, a gateway component public key, and the hash of the previous geofence contract;
   updating a proof of geofence ledger with each proof of geofence contract when the client proof of geofence certificate is similar to the gateway proof of geofence certificate; and
   providing access to at least one of an application, a document, a file, and a link for the predetermined time period when the client proof of geofence certificate is similar to the gateway proof of geofence certificate.

2. The method of claim 1 further comprising authenticating the user biometric associated with at least one of the client device and the gateway component.

3. The proof of geofence method of claim 1 further comprising repeatedly generating a separate proof of geofence contract after each predetermined time period has expired.

4. The proof of geofence method of claim 1 further comprising storing the updated proof of geofence ledger at one of a verifier component, the gateway component, and the cloud component.

5. The proof of geofence method of claim 1 further comprising enabling the gateway component to communicate with a cloud component and enabling the client device to communicate with the cloud component.

6. The proof of geofence method of claim 4 further comprising generating one or more digital signatures when the client device generates the client proof of geofence certificate within the predetermined time period and the client proof of geofence certificate is similar to the gateway proof of geofence certificate.

7. The proof of geofence method of claim 5 further comprising recording the one or more digital signatures at one of the gateway and the cloud component.

8. A location-based authentication system comprising,
   a client device having a client device short range wireless radio, wherein the client device is communicatively coupled to a cloud component;
   a known location associated with the gateway component, wherein the gateway component is communicatively coupled to the cloud component and includes a gateway short range wireless radio;
   a proof of geofence contract is generated when the client device short range wireless radio communicates with the gateway short range wireless radio, wherein the proof of geofence contract includes a gateway proof of geofence certificate and a client proof of geofence certificate;
   the gateway component generates the gateway proof of geofence certificate for the proof of geofence contract, wherein the gateway proof of geofence certificate includes a gateway timestamp, a client device public key, and a hash of a previous geofence contract;
   the client device generates the client device proof of geofence certificate within a predetermined time period with one or more client device sensors for the proof of geofence contract,
      wherein the client device proof of geofence certificate includes a client timestamp, a gateway component public key, and the hash of the previous geofence contract;
   a proof of geofence ledger that is updated with each proof of geofence contract when the client proof of geofence certificate is similar to the gateway proof of geofence certificate; and providing access to at least one of an application, a document, a file, and a link for the predetermined time period when the client proof of geofence certificate is similar to the gateway proof of geofence certificate.

9. The location-based authentication system of claim 8 further comprising a separate proof of geofence contract that is repeatedly generated after each predetermined time period has expired.

10. The location-based authentication system of claim 8 wherein the updated proof of ledger is stored at one of a verifier component, the gateway component and the cloud component.

11. The location-based authentication system of claim 8 wherein the gateway timestamp and the client timestamp are synchronized so the gateway timestamp and the client timestamp are the same.

12. The location-based authentication system of claim 8 further comprising one or more digital signatures that are generated when the client device generates the client proof of geofence certificate within the predetermined time period and the client proof of geofence certificate is similar to the gateway proof of geofence certificate.

13. The location-based authentication system of claim 12 further comprising recording the one or more digital signatures at one of the gateway and the cloud component.

14. The location-based authentication system of claim 8 further comprising a user biometric associated with at least one of the client device and the gateway component, wherein the user biometric is included in the proof of geofence contract.

15. A system for generating a proof of geofence contract, the system comprising:
    a wireless client device communicatively coupled to a cloud component, wherein the wireless client device includes a biometric input component, and the wireless client device includes a short range wireless radio;
    a gateway component communicatively coupled to the cloud component, wherein the gateway component includes a gateway location and a gateway short range wireless radio;
    a geofence generated by the gateway component, in which the gateway short range wireless radio communicates with the wireless client short range wireless radio;
    a proof of geofence protocol that includes,
        initially authenticating the wireless client device and a user biometric,
        initially authenticating the location of the wireless client device based on the gateway short range wireless radio communicating with the wireless client short range wireless radio,
        continuously generating a proof of geofence contract when the authenticated wireless client device is within the geofence, wherein the proof of geofence contract includes,
            generating, by the gateway component, a proof of geofence certificate,
            requiring the wireless client device to separately generate the proof of geofence certificate within a time period with one or more mobile device sensors,
            recording one or more signatures when the wireless client device generates the proof of geofence certificate,
            wherein the proof of geofence certificate generated by the gateway component includes a timestamp, a mobile device public key, and a hash of a previous proof of geofence contract, and
        updating a proof of geofence ledger with each proof of geofence contract.

16. The system of claim 15 further comprising a verifier component communicatively coupled to the cloud component, wherein the verifier component includes a short range wireless receiver that monitors the short range wireless communications between the wireless client device and the gateway component.

17. The system of claim 15 wherein the wireless client device separately generating the proof of geofence certificate within the time period with one or more mobile device sensors includes the timestamp, a gateway component public key, and the hash of the previous proof of geofence contract.

* * * * *